United States Patent Office 3,044,978
Patented July 17, 1962

3,044,978
NEW ADDITION POLYMERS FROM MONOMERIC VINYL COMPOUNDS AND UNSATURATED CROSS-LINKED POLYESTER RESINS AND A PROCESS FOR PREPARING THE SAME
Gustav Hägele, Wilhelm Meyer, and Friedrich Johannsen, all of Wuppertal-Elberfeld, Germany, assignors to Dr. Kurt Herberts & Co. vorm. Otto Louis Herberts, Wuppertal-Barmen, Germany
No Drawing. Filed May 4, 1959, Ser. No. 810,539
Claims priority, application Germany May 21, 1958
8 Claims. (Cl. 260—45.4)

This invention relates to new addition polymers from monomeric vinyl compounds and unsaturated cross-linked polyester resins and to a process for preparing the same.

More particularly the invention relates to the new addition polymers of a member of the group consisting of styrene and vinyltoluene with an unsaturated polyester resin containing in its molecule $\alpha,\beta$-unsaturated dicarboxylic acid ester groupings and groupings of the formula

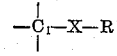

wherein $C_1$ represents a carbon atom of the polyester molecule, R represents a member of the group consisting of the endomethylene tetrahydrophenyl radical, the endomethylene hexahydrophenyl radical, the 1.4-methano-bicyclo-[4.3.0]-nonenyl radical and the 1.4-methano-bicyclo-[4.3.0]-nonyl radical, and X represents a member of the group consisting of the group —COO— (the carbon atom being bound to $C_1$) and the group —COOR$_1$— (the carbon atom of the group —COO— being bound to $C_1$ and $R_1$ representing an alkylene-group containing 1–4 carbon atoms), the group —O— and the group

—OOC—R$_1$—O—

($R_1$ representing an alkylene-group containing 1–4 carbon atoms).

The endomethylene tetrahydrophenyl radical has the following Formula I and the 1.4-methano-bicyclo-[4.3.0]-nonenyl radical has the following Formula II:

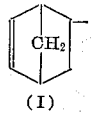

(I)

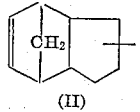

(II)

The endomethylene hexahydrophenyl radical and the 1.4-methano-bicyclo-[4.3.0]-nonyl radical are produced by hydrogenation of the radicals I and II, respeutively.

It is known to produce films and hardened shaped structures by addition polymerisation of monomeric vinyl compounds with unsaturated polyester resins, the said unsaturated polyesters being linear or cross-linked. Styrene and homologues of styrene, such as vinyl toluene are advantageously employed as monomeric vinyl compounds. The linear unsaturated polyester resins are prepared by reaction of saturated dihydric alcohols with $\alpha,\beta$-unsaturated dicarboxylic acids or their anhydrides, for example maleic acid anhydride or mixtures thereof with saturated dicarboxylic acids, for example phthalic acid anhydride. It is preferred to use mixtures of maleic and phthalic acid anhydrides. Unsaturated polyester resins with a cross-linked structure have also been prepared. The cross-linking is produced by wholly or partially replacing the bifunctional compounds used in the formation of the linear polyester with higher functional compounds. The degree of cross-linking is controlled by adding monofunctional compounds as chain-breaking agents. The addition polymers of the unsaturated polyester resins with monomeric vinyl compounds frequently produce surfaces which do not dry satisfactorily or which are tacky. Various methods have been tried to avoid or reduce this undesired property. One such method is to add paraffin. Moreover, unsaturated polyester resins have been after-treated with cyclopentadiene and thereby products have been obtained which included the radicals of endomethylene tetrahydrophthalic acid incorporated into the polyester chain. This acid was also used as a dicarboxylic acid in the production of unsaturated polyester resins. It is also known to use polycyclic dihydric alcohols in place of dihydric alcohols. One such example is the product obtained from dicyclopentadiene by treatment with carbon monoxide and hydrogen followed by subsequent hydrogenation to the diol. The dihydric alcohol thus obtained is incorporated into the polyester chain in the same way as a glycol i.e. with the formation of a linear unsaturated polyester resin.

The object of the present invention is to produce addition products which have good drying surfaces from unsaturated cross-linked polyester resins, which are only cross-linked to such a degree that they still have good solubility in organic solvents, by reaction with styrene or vinyl toluene.

It has been found that products having the properties set forth are obtained if the initial products used for the production of the addition polymers are unsaturated cross-linked polyester resins which contain in their molecule endomethylene tetrahydrophenyl, endomethylene hexahydrophenyl, 1.4-methano-bicyclo-[4.3.0]-nonenyl- or 1.4-methano-bicyclo-[4.3.0]-nonyl-radicals and which are cross-linked only to such a degree that they are still sufficiently soluble in styrene or its homologues.

The said radicals are introduced into the unsaturated polyester resins by using monohydric alcohols containing the type of radicals stated above. Preferred monohydric alcohols (compare German Patent 937,289); are dicyclopentadienyl alcohol, dihydro-di-cyclopentadienyl alcohol, endomethylene tetrahydrobenzyl alcohol and endomethylene hexahydrobenzyl alcohol (compare "Farbe und Lack," 1956, p. 184, right column). The cross-linked unsaturated polyester resins obtained thereby contain the grouping

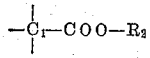

wherein $C_1$ represents a carbon atom of one of the carboxylic acid radicals of the polyester molecule and $R_2$ represents a member of the group consisting of the dicyclopentadienyl-, the dihydrodicyclopentadienyl-, the endomethylenetetrahydrobenzyl- and the endomethylenehexahydrobenzyl radicals.

As the main components for the production of the unsaturated polyester resins the same dicarboxylic or polycarboxylic acid anhydrides or the corresponding acids on the one hand and the same dihydric or polyhydric alcohols on the other hand are employed as are used in the production of the known cross-linked unsaturated polyester resins. In each case, maleic acid or its anhydride is used as the essential dicarboxylic acid component according to the process of the present invention in order to obtain the number of double bonds necessary for carrying out the addition polymerisation. Maleic acid anhydride, by itself or in admixture with phthalic acid anhydride, is preferably used. Aconitic acid or pyromellitic acid can for example be used as polycarboxylic acids. In addition to the monohydric alcohols already mentioned, the alcohols used can be glycols such as ethylene glycol or propylene glycol, or polyhydric alcohols such as gycerine, trimethylol propane, pentaerythritol or higher alcohols derived from sugars, such as hixite. Mixtures of these compounds may also be used.

The number of the hydroxyl groups introduced into the reaction mixture must be so large that it is sufficient to esterify all the carboxyl groups introduced into the reaction mixture, i.e. the molar proportion between the total of monohydric, dihydric, and higher hydric alcohols and the total of unsaturated and saturated acids should be such that the number of carboxyl groups is substantially the same as the number of hydroxyl groups.

The following ratios should be established between monohydric, dihydric alcohols and higher hydric alcohols:

About 15 to 40% of the hydroxyl groups introduced should be in the form of monohydric alcohols, i.e. the molar proportion between the polycyclic monohydric alcohols and the total of the polyhydric alcohols having at least 3 hydroxyl groups and the glycols preferably is in the range of 1:3 to 4:1. About 40 to 100% of the hydroxyl groups then remaining should be in the form of alcohols having three or more hydroxyl groups and any remainder which may still be left should consist of dihydric alcohols, i.e. the molar proportion between the polyhydric alcohols containing at least 3 hydroxyl groups and the glycols preferably is in the range of 1:5 to 1:0. As the proportion of the hydroxyl groups originating from alcohols having three or more hydroxyl groups increases the proportion of monohydric alcohols should also increase. Moreover, the proportions of the different reactants which are necessary in order to obtain the correct degree of cross-linking and solubility in each individual case can easily be determined by experiment. The invention is not based on the adjustment of the ratios between these reactants, which is known per se, but in the knowledge that the introduction of the monohydric alcohols to be used in the present invention leads to final products with properties which are improved in a surprising manner.

The unsaturated cross-linking polyester resins produced according to the invention can be transformed with styrene and vinyl toluene into addition polymers having surprisingly good properties. The polymers yield moulded elements which harden in air, laminated elements, foils with and without reinforcing, such for example as glass, asbestos and textile fibres and fabrics, in a pure and chemically converted form, as well as films having surprisingly good surface properties and good mechanical workability.

Products having good flowing power, high elasticity and lustrous surfaces are obtained if some of the dicarboxylic acid is replaced by the adduct of maleic acid anhydride and olefines with 4 to 12 carbon atoms, in which case, depending on the chain length of the added olefines, the proportion of the adduct should be 5 to 25 mol percent of the dicarboxylic acids introduced.

According to one preferred form of the invention, the final products are obtained in a uniformly condensed form which is soluble in the usual solvents within narrow viscosity limits if the initial products are not reacted in a single-stage process, i.e. jointly, but by using a multi-stage process in such a manner that initially, partial condensation products are made from the initial products, and these are then further processed.

According to this form of the process, the monohydric alcohol is so reacted with the molten polycarboxylic acid anhydrides that a liquid mixture which contains the monoester formed from the monohydric alcohol and the corresponding quantity of the added polycarboxylic acid anhydrides, as well as the unreacted polycarboxylic acid anhydrides is formed. The liquid mixture of halfesters and anhydrides preferably is so formed that, while stirring the monohydric alcohol is introduced into a melt of the anhydride, for example maleic acid anhydride, at a temperature just above the melting point of the anhydride, the alcohol quickly reacting with the anhydride to form the halfester and raising of the temperature. Independently thereof, the alcohols of high valency which do not melt without decomposition, for example pentaerythritol, are dissolved in the other polyhydric alcohols which can be melted or are already liquid at room temperature. This solution of alcohols is then introduced while stirring into the hot mixture of halfester and anhydrides, the temperature being kept at such a high level that the unmeltable polyhydric alcohol remains in solution. The reaction mixture thus obtained is heated while driving off the water of reaction until an acid number of about 30 to 50 is reached.

Preferably, the necessary constancy of temperature during the reaction is assured by adding an agent which allows the driving off of the water of reaction by way of azeotropic fractional distillation, such as an alkyl aromatic substance. The entraining agent preferably is added with or after the alcohols, and here also the temperature of the reaction mixture must be kept sufficiently high in order to prevent the precipitation of the unmeltable polyhydric alcohol from the reaction mixture.

The invention is further illustrated by the following examples:

*Example 1*

784 g. of maleic acid anhydride, 444 g. of phthalic acid anhydride, 460 g. of glycerine and 1050 g. of dicyclopentadienyl alcohol are azeotropically esterified with 1000 ccm of xylene in a $CO_2$ atmosphere until an acid number of 38 is reached, the xylene is extracted at 100 mm. Hg and 160° C., 0.4 g. of hydroquinone is added and diluted with 1370 g. of styrene in portions at 120° C. while stirring vigorously.

85 parts of this solution are diluted with 15 parts of styrene, 4 parts of a 10% solution of cobalt naphthenate in styrene and 10 parts of a 16% solution of methylethylketone hydroperoxide in methylethylketone/acetic ester and applied with a spray pistol onto wood. The clear film was non-tacky after 30 minutes and could be buffed and polished after 15 hours.

*Example 2*

75 parts of the polyester solution prepared according to Example 1 are diluted with another 8.8 parts of styrene, 3.4 parts of cobalt naphthenate as a 10% solution in styrene, and 8.8 parts of a 16% solution of methylethylketone hydroperoxide in methylethylketone/acetic ester while stirring well. Absorbent paper impregnated with this solution was dust-dry after 15 minutes, resistant to pressure and very elastic with good vapour impermeability after 8 hours.

*Example 3*

882 g. of maleic acid anhydride, 592 g. of phthalic acid anhydride, 544 g. of pentaerythritol and 1500 g. of dihydrodicyclo-pentadienyl alcohol are esterified with 1400 ccm of xylene in a similar way to Example 1 to give an acid number of 43, the xylene is removed at 80 mm. Hg, 0.015% of hydroquinone is added and the mixture diluted at 120° C. with 1770 g. of styrene.

From 100 parts of this solution and 45 parts of calcium carbonate, 20 parts of barium sulphate, 10 parts of titanium dioxide and 2 parts of cyclohexanone peroxide as a 50% solution in dibutyl phthalate, it is possible to prepare a trowelling compound which, after adding another 0.01% of hydroquinone and 0.7 part of 10% cobalt naphthenate in styrene, dries in non-tacky manner within one hour and which can be polished after 8 hours.

*Example 4*

1666 g. of maleic acid anhydride, 1072 g. of trimethylol propane and 1240 g. of endomethylene tetrahydrobenzyl alcohol (compare "Farbe and Lack," 1956, p. 184, right column) are esterified azeotropically with 1500 ccm of xylene as described in example 1 to give an acid number of 41, the xylene is extracted in vacuo. 0.015% of hydroquinone is added and the mixture diluted with 2020 g. of styrene.

55 parts of this solution are stirred into a paste with 20 parts of titanium dioxide, 10 parts of barium sulphate, half a part of finely divided silicic acid (compare Römpp, "Chemie-Lexikon" 4, edition, p. 54), 3 parts of benzoyl peroxide and 11½ parts of styrene, and a glass fibre mat is coated with this paste. After 15 minutes initial polymerisation at 65° C., the fibre material thus impregnated can be hardened under pressure at 90° C. to provide very stable moulded or pressed elements.

*Example 5*

686 g. of maleic acid anhydride, 296 g. of phthalic acid anhydride, 756 g. of endomethylene hexahydrobenzyl alcohol, 408 g. of n-hexanol and 364 g. of hexite are esterified azeotropically with 1000 ccm. of xylene to an acid number of 45 as indicated in Example 1 and the xylene is extracted in vacuo. 0.015% of hydroquinone is added and the mixture diluted with 1265 g. of styrene.

60 parts of this polyester solution are stirred with 25 parts of kaolin, 12 parts of titanium dioxide and 3 parts of benzoyl peroxide to form a paste. 70 parts of this paste are then polymerised initially at 80° C. with 30 parts of powdered glass or asbestos fibre on a 2-roll stand and the product is removed and cooled. After comminution, the product is pressed in a mould at a pressure of 70 kg./cm.$^2$ and a temperature of 120° C. to form moulded elements having very good thermal stability and high elasticity.

*Example 6*

70 parts of the polyester solution prepared in Example 5 are mixed intimately with 5 parts of titanium dioxide, 20 parts of barium sulphate, 2 parts of aerosil and 3 parts of benzoyl peroxide. Jute fabric coated is superimposed thereon in several layers, initially polymerised in an oven at 70° C. for 10 minutes and pressed in moulds at a pressure of 50 kg./cm.$^2$ and a temperature of 110° C. to form moulded elements which are very resistant to impact.

*Example 7*

197 g. of maleic acid anhydride are added to 63 g. of the adduct of $\alpha$-butylene and maleic acid anhydride, 82 g. of pentaerythritol, 124 g. of ethylene glycol and 332 g. of glycolic acid dicyclopentadienyl ether and esterified azeotropically with xylene to an acid number of 35 mg. KOH/g. of polyester solution. The xylene is removed in vacuo and the mixture is diluted with styrene to a 70% solid content after adding 0.01% of hydroquinone. The product is less viscous in the form of its 70% solution in styrene and yields a film which is substantially more elastic and has better flow properties, which film can be satisfactorily buffed and polished.

*Example 8*

235 g. of maleic acid anhydride, 45 g. of the adduct of dodecene-1 and maleic acid anhydride, 83 g. of glycol, 62 g. of glycerine, 120 g. of dicyclopentadienyl alcohol and 200 ccm. of xylene are esterified azeotropically while centrifuging until an acid number of 48 is reached, the xylene is extracted at 90 mm. Hg and 160° C., 72 mg. of hydroquinone are added and the mixture is diluted at 120° C. with styrene to a solid content of 65%. The film, hardened with the addition of a catalyst and accelerator, has a completely smooth lustrous surface and can be buffed and polished after 14 hours.

*Example 9*

520 g. of maleic acid anhydride are melted and 372 g. of dicyclopentadienyl alcohol are introduced into the melt at 70° C. A solution of 48 g. of pentaerythritol in 98 g. of glycerine and 160 g. of butane-1.4-diol is prepared separately at 100 to 120° C. and introduced into the first-mentioned solution at a temperature of 110° C. while stirring well, care being taken that the internal temperature does not exceed 140° C. With further stirring, 400 ccm. of xylene are so run in that the temperature in the flask does not fall and the solution remains homogeneous. With circulation and separation of water in the presence of $CO_2$ as an inert gas, the mixture is esterified within 13 hours to an acid number of 40 and the xylene is extracted in a vacuum of 40 mm. Hg, the internal temperature not exceeding 160° C. The vacuum is removed with carbon dioxide, 0.165 g. of hydroquinone are incorporated by stirring and the mixture is diluted at 120° C. with 595 g. of vinyl toluene to a solid content of 65%.

A sample with 4% of a 10% cobalt naphthenate solution and 10% of a 16% solution of methylethylketone hydroperoxide is sprayed onto wood and, after hardening, gives a smooth lustrous film which is dust-dry after one hour and can be satisfactorily buffed and polished after standing overnight. In five comparison experiments which were carried out, the viscosity of the styrene solution fluctuated between 1235 cp.$_{25°\ C.}$ and 1290 cp.$_{25°\ C.}$

*Example 10*

A mixture of 190 g. of dicyclopentadienyl alcohol and 124 g. of n-octanol are introduced into a melt of 311 g. of maleic acid anhydride and 234 g. of phthalic acid anhydride and, as described in Example 9, the separately prepared solution of 43 g. of pentaerythritol in 128 g. of hexanetriol and 168 g. of diglycol is added and the reaction mixture is mixed with 400 ccm. of xylene. After esterifying for 22 hours in a $CO_2$ atmosphere, the reaction is stopped when the acid number is 41 and the xylene is extracted in vacuo. 0.16 g. of hydroquinone is added and a solid content is adjusted to 65% at 120° C. with 595 g. of styrene. The viscosity of the styrene solution fluctuates between 245 and 261 cp.$_{20°\ C.}$ in six comparison experiments which were carried out, and the elastic polyester after hardening is free from tension and is excellently suitable for curing with glass fibre material or the like to give moulded elements.

*Example 11*

The mixture of 179 g. of dicyclopentadienyl alcohol and 122 g. of n-hexanol is introduced into a melt of 204 g. of maleic acid anhydride, 220 g. of phthalic acid anhydride and 174 g. of adipic acid. As described in Example 9, a solution of 41 g. of pentaerythritol in 37 g. of ethylene glycol, 63 g. of diglycol and 160 g. of hexanetriol is added and then 400 ccm. of xylene are introduced. After centrifuging under $CO_2$ for 18½ hours, the acid number is 45.4.

The xylene is then extracted at 160° C./40 mm. Hg, 0.165 g. of hydroquinone is added and the mixture is adjusted with 590 g. of styrene to a solid content of 65% at 120° C. The viscosity of the solution is very low (183 cp.) and the viscosities obtained in the comparison experiments are within the limits of ±8. In the cold, the styrene solution can be cured directly or after reinforcing with glass fibre material and the like. Depending on the quantity of hardener and accelerator, it is possible to form non-tacky, very flexible moulded elements, which can easily be worked with a knife and only reach their full degree of hardness after being at a temperature of 80° C. for one hour.

What we claim is:

1. Addition polymers of a member selected from the group consisting of styrene and vinyltoluene with an unsaturated polyester resin substantially soluble in styrene and its homologues comprising the reaction product of
(A) a member selected from the group consisting of $\alpha,\beta$-unsaturated dicarboxylic acids, their anhydrides and mixtures thereof with a substance selected from the group consisting of polycarboxylic acids and their anhydrides, (B) a polycyclic monohydric alcohol of the formula

Y—R wherein R represents a member selected from the groups consisting of the endomethylene tetrahydrophenyl radical, the endomethylene hexahydrophenyl radical, the 1.4-methano-bicyclo-[4.3.0]-nonenyl radical, and the 1.4-methano-bicyclo-[4.3.0]-nonyl radical and Y is a member selected from the group consisting of the hydroxyl and the hydroxy alkylene groups having 1 to 4 carbon atoms, (C) at least one polyhydric alcohol having at least 3 hydroxyl groups.

2. Addition polymers of a member selected from the group consisting of styrene and vinyltoluene with an unsaturated polyester resin substantially soluble in styrene and its homologues comprising the reaction product of
   (A) a member selected from the group consisting of α,β-unsaturated dicarboxylic acids, their anhydrides and mixtures thereof with a substance selected from the group consisting of polycarboxylic acids and their anhydrides,
   (B) a polycyclic monohydric alcohol of the formula

Y—R wherein R represents a member selected from the group consisting of the endomethylene tetrahydrophenyl radical, the endomethylene hexahydrophenyl radical, the 1.4-methano-bicyclo-[4.3.0]-nonenyl radical, and the 1.4-methano-bicyclo-[4.3.0]-nonyl radical and Y is a member selected from the group consisting of the hydroxyl and the hydroxy alkylene groups having 1 to 4 carbon atoms,
   (C) at least one polyhydric alcohol having at least 3 hydroxyl groups, and
   (D) aliphatic glycols.

3. Addition polymers of a member selected from the group consisting of styrene and vinyltoluene with an unsaturated polyester resin substantially soluble in styrene and its homologues comprising the reaction product of
   (A) a member selected from the group consisting of α,β-unsaturated dicarboxylic acids, their anhydrides and mixtures thereof with a substance selected from the group consisting of polycarboxylic acids and their anhydrides,
   (B) a polycyclic monohydric alcohol of the formula

Y—R wherein R represents a member selected from the group consisting of the endomethylene tetrahydrophenyl radical, the endomethylene hexahydrophenyl radical, the 1.4-methano-bicyclo-[4.3.0]-nonenyl radical, and the 1.4-methano-bicyclo-[4.3.0]-nonyl radical and Y is a member selected from the group consisting of the hydroxyl and the hydroxy alkylene groups having 1 to 4 carbon atoms,
   (C) at least one polyhydric alcohol having at least 3 hydroxyl groups, and
   (D) aliphatic glycols;
the molar proportion between said polycyclic monohydric alcohol and the total of said polyhydric alcohols having at least 3 hydroxyl groups and said aliphatic glycols being in the range of 1:3 to 4:1, the molar proportion between said polyhydric alcohols having at least 3 hydroxyl groups and said aliphatic glycols being in the range of 1:5 to 1:0, and the molar proportion between the total of acids and the total of alcohols being such that the number of carboxyl groups is substantially the same as the number of hydroxyl groups.

4. Addition polymers of styrene with an unsaturated polyester resin substantially soluble in styrene and its homologues comprising the reaction product of
   (A) a member selected from the group consisting of maleic acid, its anhydride, and mixtures thereof with phthalic acid and its anhydride, (B) a polycyclic monohydric alcohol of the formula

Y—R wherein R represents a member selected from the group consisting of the endomethylene tetrahydrophenyl radical, the endomethylene hexahydrophenyl radical, the 1.4-methano-bicyclo-[4.3.0]-nonenyl radical, and the 1.4-methano-bicyclo-[4.3.0]-nonyl radical and Y is a member selected from the group consisting of the hydroxyl and the hydroxy alkylene groups having 1 to 4 carbon atoms,
   (C) at least one polyhydric alcohol having at least 3 hydroxyl groups, and
   (D) aliphatic glycols;
the molar proportion between said polycyclic monohydric alcohol and the total of said polyhydric alcohols having at least 3 hydroxyl groups and said aliphatic glycols being in the range of 1:3 to 4:1, the molar proportion between said polyhydric alcohols having at least 3 hydroxyl groups and said aliphatic glycols being in the range of 1:5 to 1:0, and the molar proportion between the total of acids and the total of alcohols being such that the number of carboxyl groups is substantially the same as the number of hydroxyl groups.

5. Addition polymers of styrene with an unsaturated polyester resin substantially soluble in styrene and its homologues comprising the reaction product of
   (A) a member selected from the group consisting of maleic acid, its anhydride, and mixtures thereof with phthalic acid and its anhydride
   (B) dicyclopentadienyl alcohol,
   (C) at least one polyhydric alcohol having at least 3 hydroxyl groups, and
   (D) aliphatic glycol;
the molar proportion between dicyclopentadienyl alcohol and the total of said polyhydric alcohols having at least 3 hydroxyl groups and said aliphatic glycols being in the range of 1:3 to 4:1, the molar proportion between said polyhydric alcohols having at least 3 hydroxyl groups and said aliphatic glycols being in the range of 1:5 to 1:0, and the molar proportion between the total of acids and the total of alcohols being such that the number of carboxyl groups is substantially the same as the number of hydroxyl groups.

6. Addition polymers of styrene with an unsaturated polyester resin substantially soluble in styrene and its homologues comprising the reaction product of
   (A) a member selected from the group consisting of maleic acid, its anhydride, and mixtures thereof with phthalic acid and its anhydride,
   (B) endomethylene tetrahydrobenzyl alcohol,
   (C) at least one polyhydric alcohol having at least 3 hydroxyl groups, and
   (D) aliphatic glycols;
the molar proportion between endomethylene tetrahydrobenzyl alcohol and the total of said polyhydric alcohols having at least 3 hydroxyl groups and said aliphatic glycols being in the range of 1:3 to 4:1, the molar proportion between said polyhydric alcohols having at least 3 hydroxyl groups and said aliphatic glycols being in the range of 1:5 to 1:0, and the molar proportion between the total of acids and the total of alcohols being such that the number of carboxyl groups is substantially the same as the number of hydroxyl groups.

7. Addition polymers of styrene with an unsaturated polyester resin substantially soluble in styrene and its homologues comprising the reaction product of
   (A) a member selected from the group consisting of maleic acid, its anhydride, and mixtures thereof with phthalic acid and its anhydride,
   (B) dihydrodicyclopentadienyl alcohol,
   (C) at least one polyhydric alcohol having at least 3 hydroxyl groups, and
   (D) aliphatic glycols;
the molar proportion between dihydrodicyclopentadienyl alcohol and the total of said polyhydric alcohols having at least 3 hydroxyl groups and said aliphatic glycol being in the range of 1:3 to 4:1, the molar proportion between said polyhydric alcohols having at least 3 hydroxyl groups and said aliphatic glycols being in the range of 1:5 to 1:0, and the molar proportion between the total of acids and the total of alcohols being such that the number of carboxyl groups is substantially the same as the number of hydroxyl groups.

8. Addition polymers of styrene with an unsaturated polyester resin substantially soluble in styrene and its homologues comprising the reaction of
   (A) a member selected from the group consisting of maleic acid, its anhydride, and mixtures thereof with phthalic acid and its anhydride,
   (B) endomethylene hexahydrobenzyl alcohol,
   (C) at least one polyhydric alcohol having at least 3 hydroxyl groups, and
   (D) aliphatic glycols;
the molar proportion between endomethylene hexahydrobenzyl alcohol and the total of said polyhydric alcohols having at least 3 hydroxyl groups and said aliphatic glycols being in the range of 1:3 to 4:1, the molar proportion between said polyhydric alcohols having at least 3 hydroxyl groups and said aliphatic glycols being in the range of 1:5 to 1:0, and the molar proportion between the total of acids and the total of alcohols being such that the number of carboxyl groups is substantially the same as the number of hydroxyl groups.

References Cited in the file of this patent

UNITED STATES PATENTS

| | | |
|---|---|---|
| 2,280,242 | Kropa et al. | Apr. 21, 1942 |
| 2,817,673 | Roelen et al. | Dec. 24, 1957 |
| 2,951,823 | Sauer | Sept. 6, 1960 |

FOREIGN PATENTS

| | | |
|---|---|---|
| 656,138 | Great Britain | Aug. 15, 1951 |
| 766,666 | Great Britain | Jan. 23, 1957 |

OTHER REFERENCES

Patterson: "The Ring Index," Reinhold, 1940, New York, pages 24 and 25, section 19 (2 pp. test).